Aug. 20, 1957 W. D. HOWELL 2,803,405
AUTOMATIC COUNTING APPARATUS
Filed June 2, 1952 11 Sheets-Sheet 1
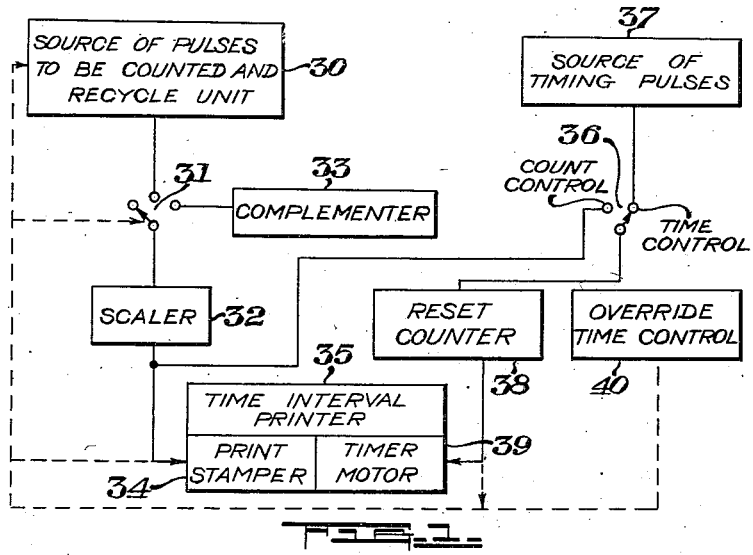
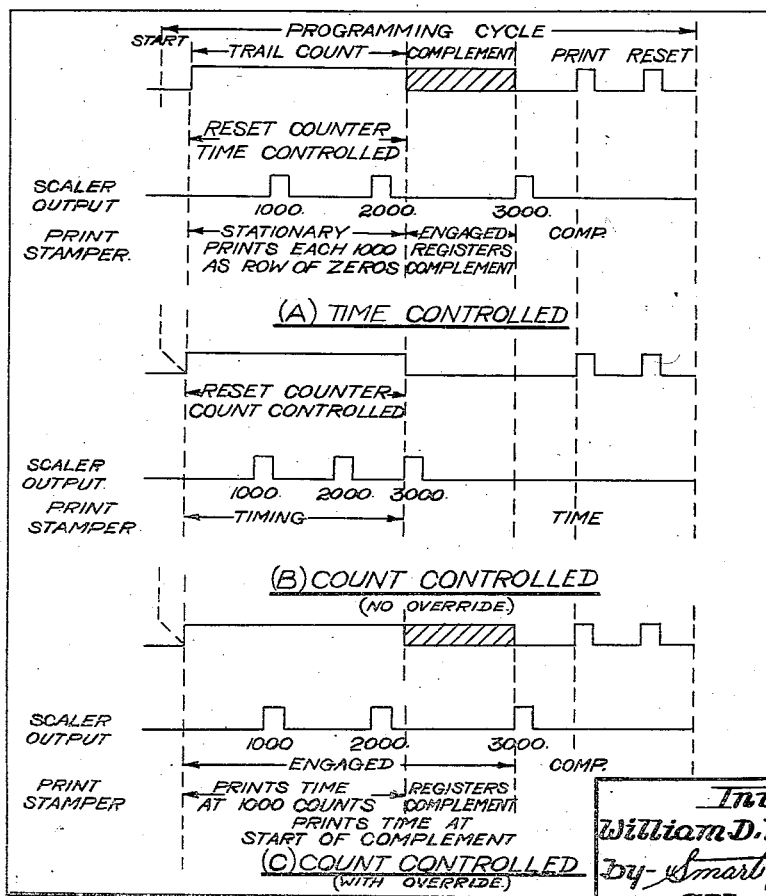
Inventor
William D. Howell
by Smart & Biggar
Attorneys.

Aug. 20, 1957 W. D. HOWELL 2,803,405
AUTOMATIC COUNTING APPARATUS
Filed June 2, 1952 11 Sheets-Sheet 2
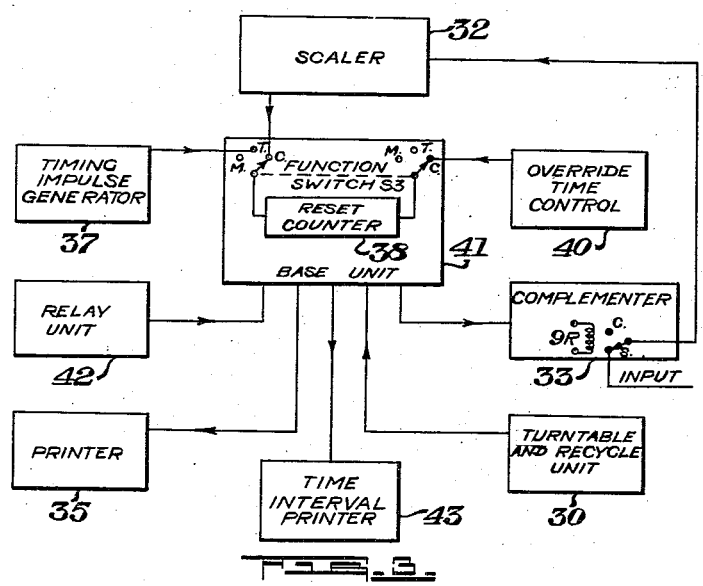
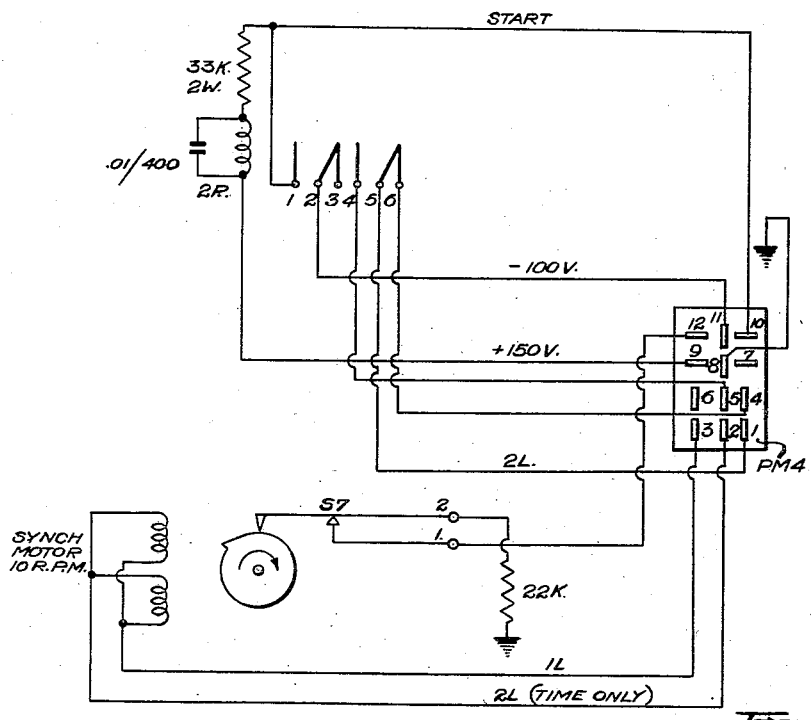
Inventor
William D. Howell
by Smart & Biggar
Attorneys.

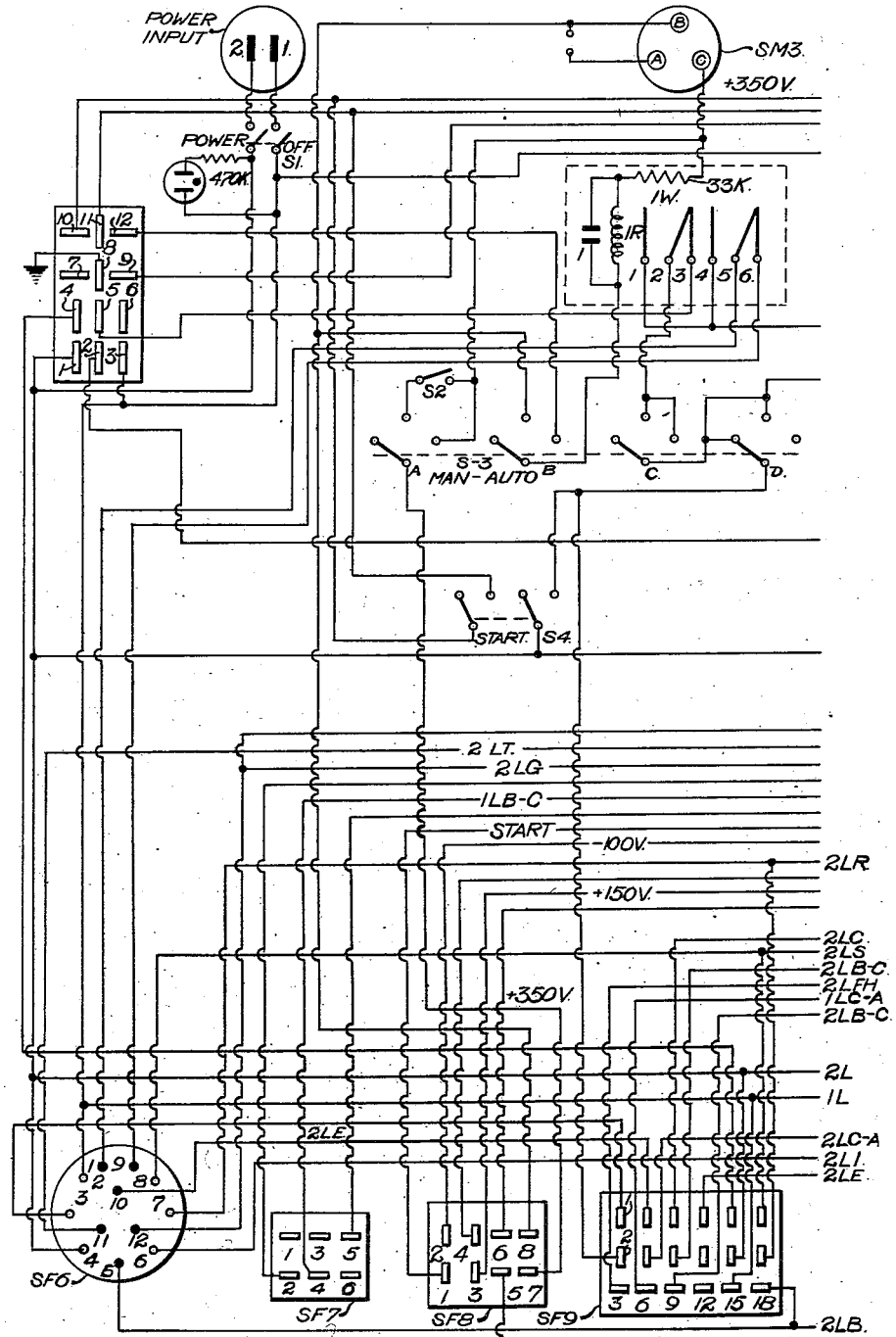

Aug. 20, 1957 W. D. HOWELL 2,803,405
AUTOMATIC COUNTING APPARATUS
Filed June 2, 1952 11 Sheets-Sheet 4
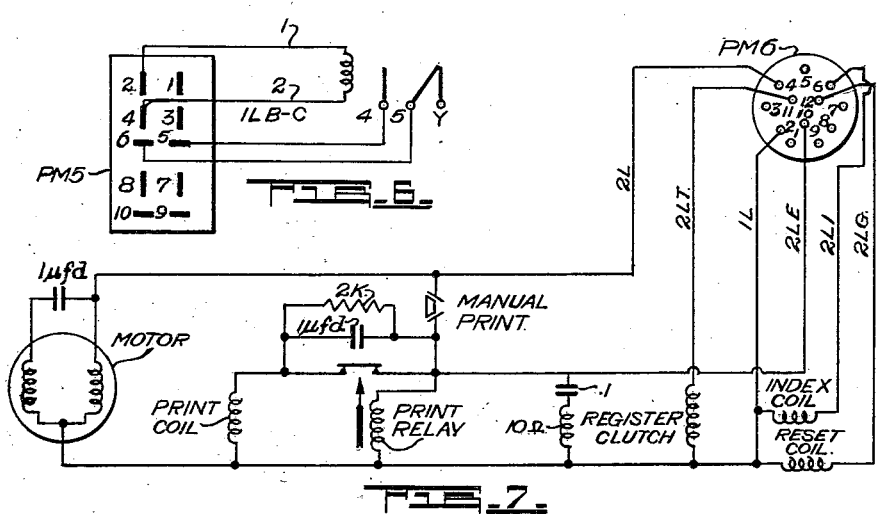
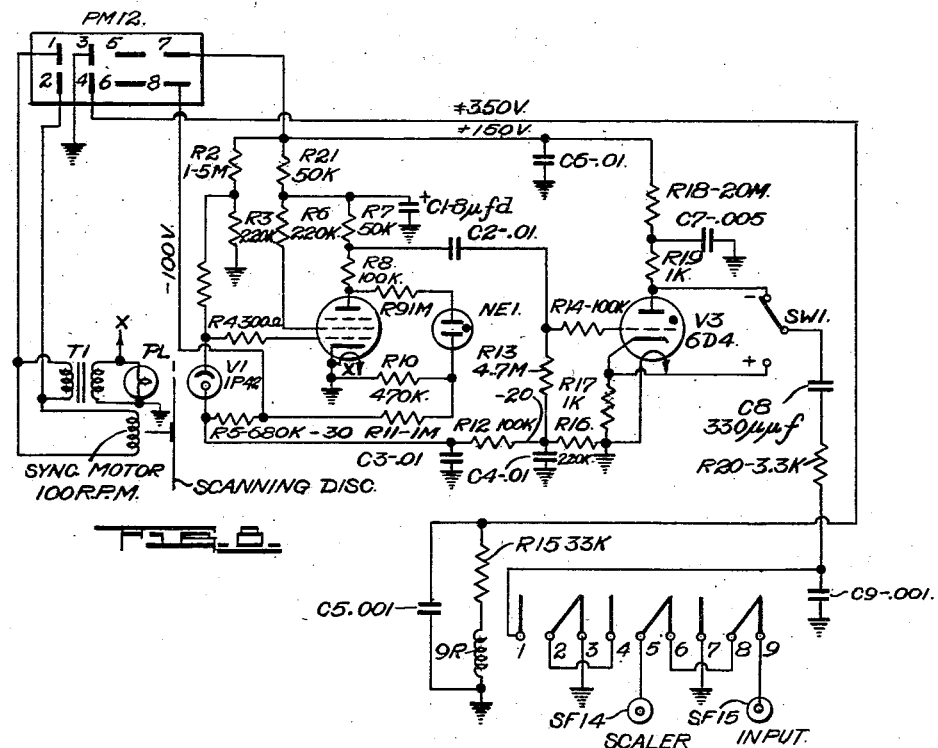
Inventor
William D. Howell
by Smart & Biggar
Attorneys

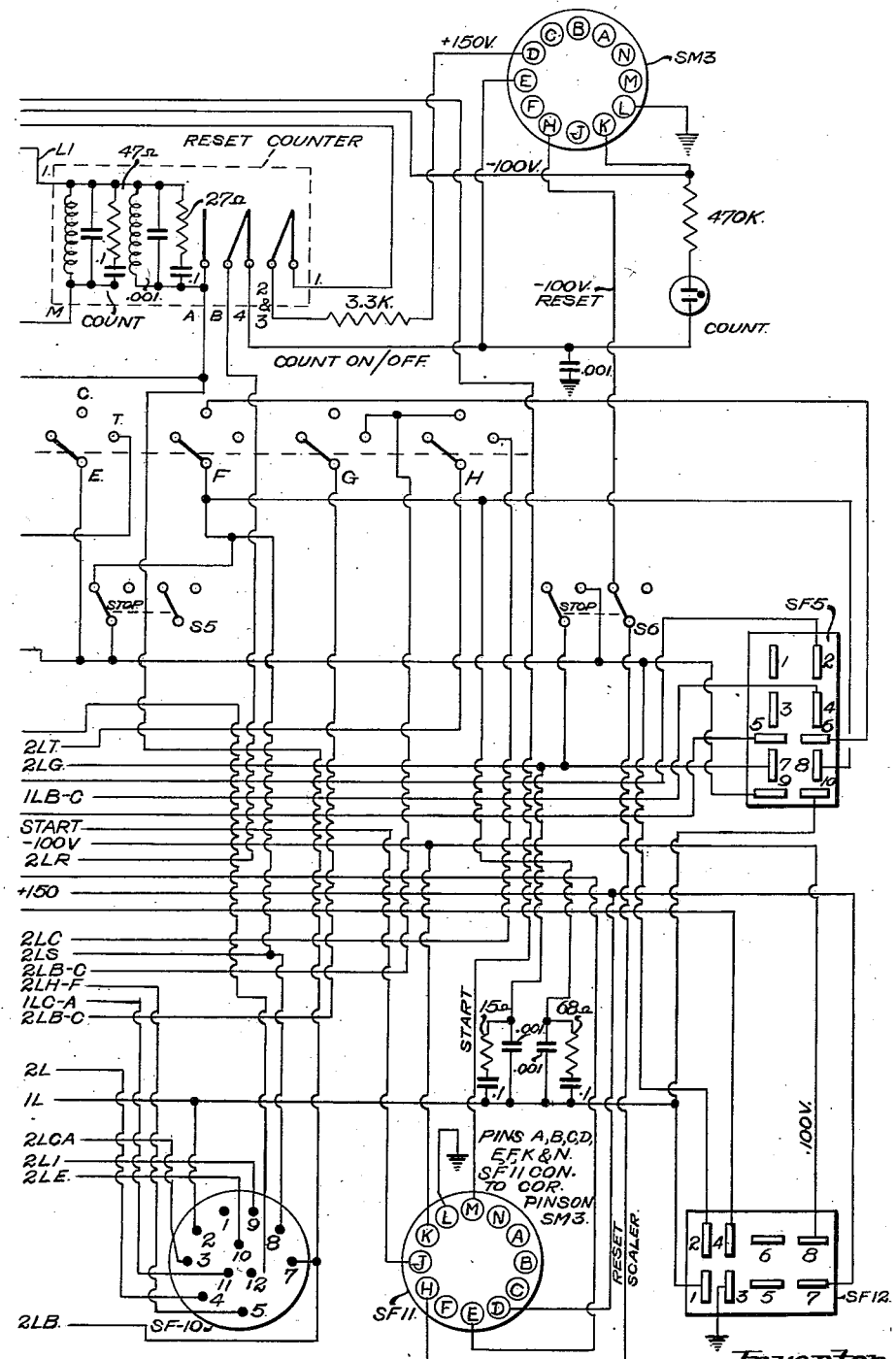

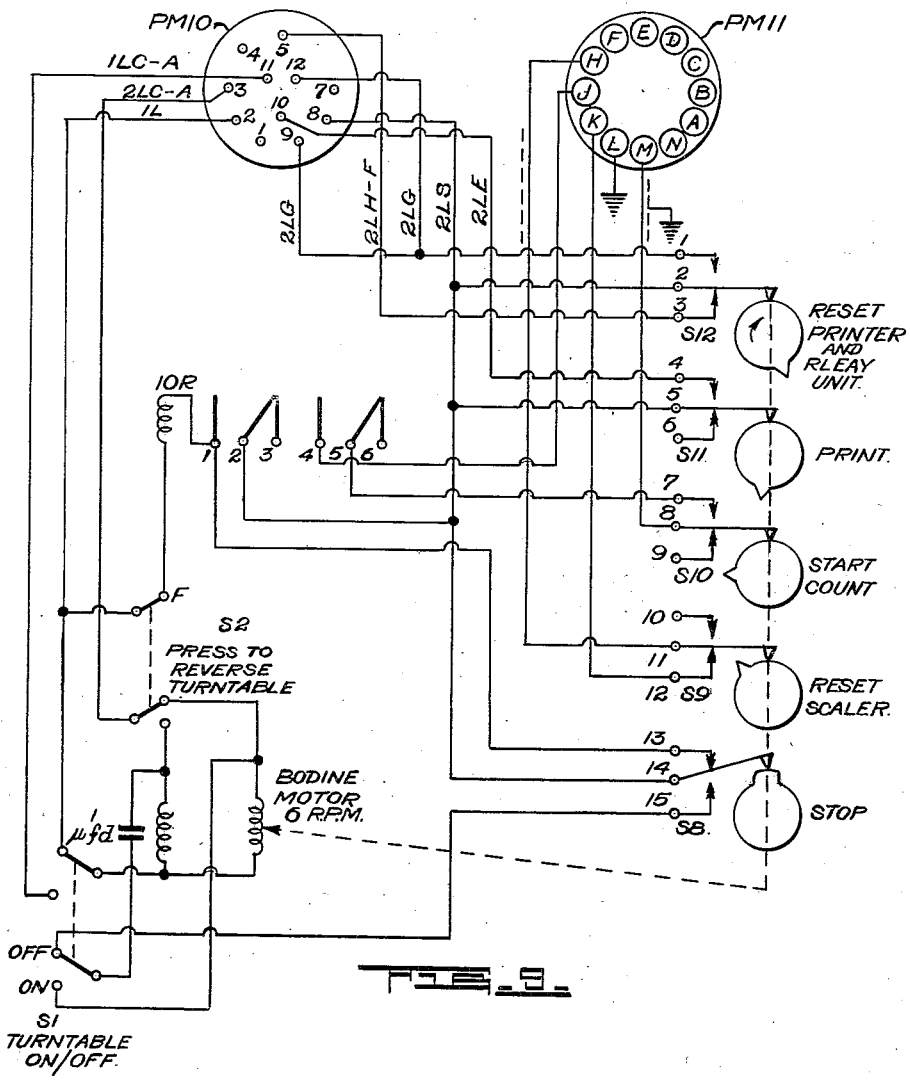

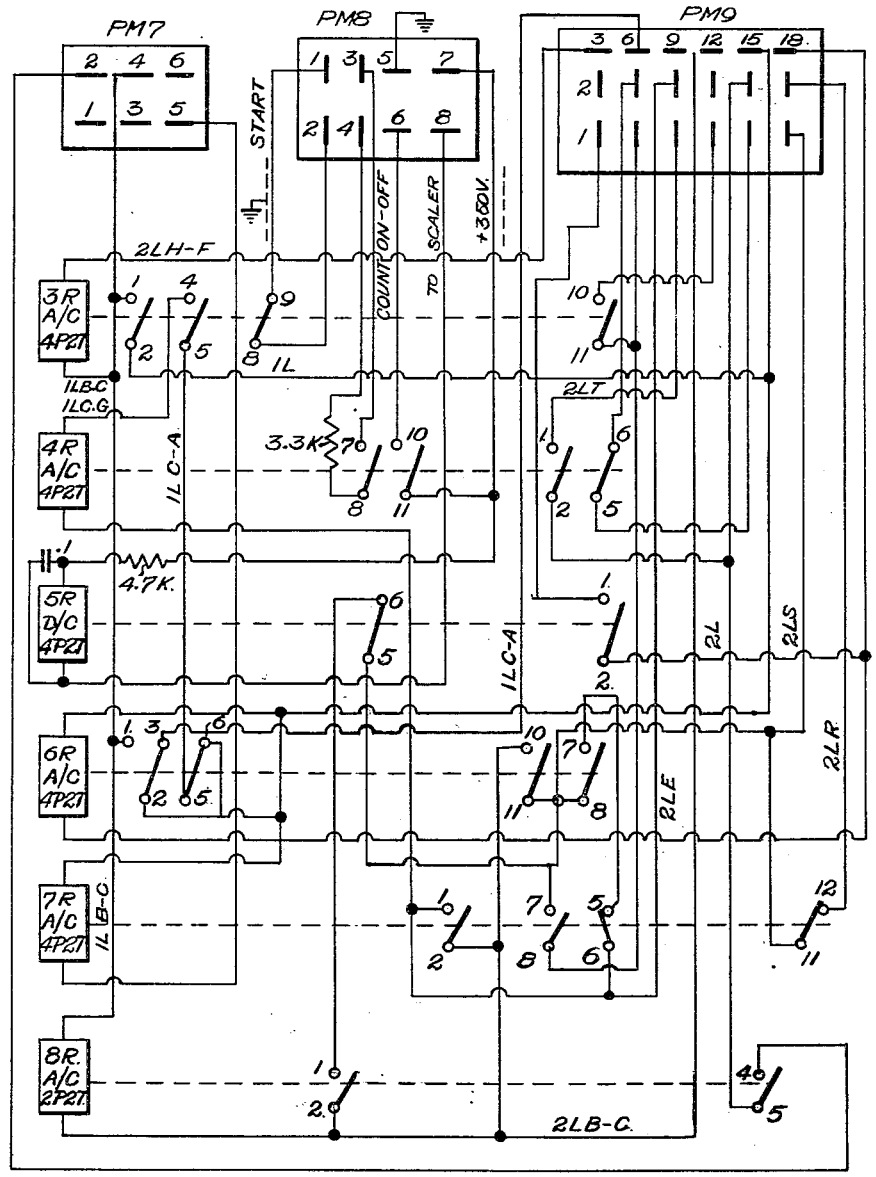

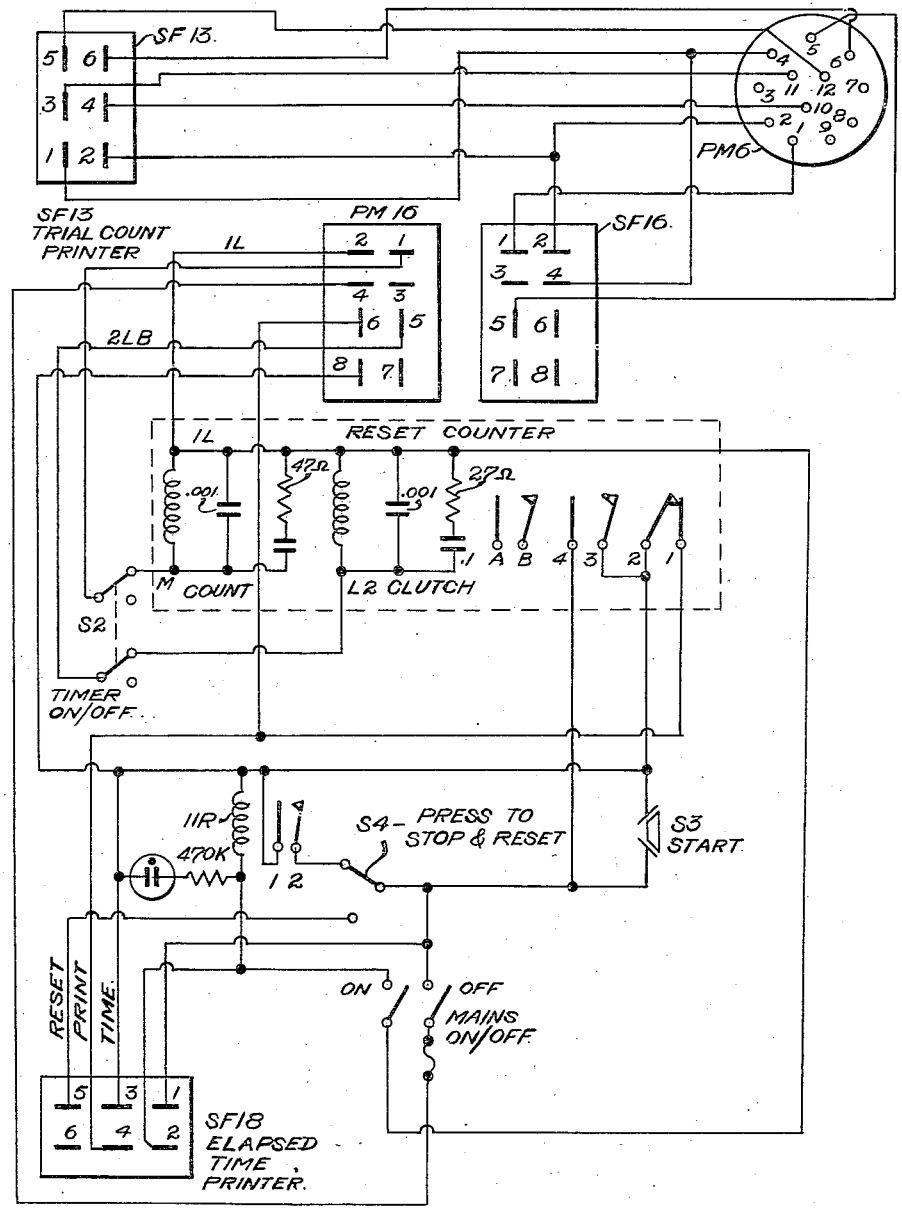

Aug. 20, 1957  W. D. HOWELL  2,803,405
AUTOMATIC COUNTING APPARATUS
Filed June 2, 1952  11 Sheets-Sheet 9

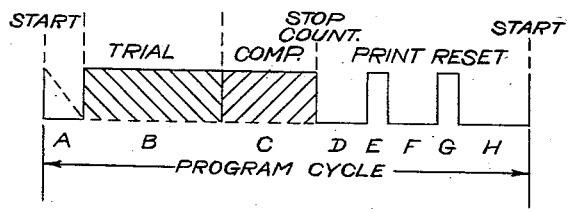

LINE CODE
(TIME OF ENERGIZATION)

LINE .1.

1L.     ALL TIMES
1LB-C.  DURING TRIAL AND COMPLEMENT.
1LC-A.  ALL TIMES EXCEPT DURING TRIAL COUNT.
1LC-G.  DURING COMPLEMENT TO RESET. (A.C)

LINE. 2.

2L      ALL TIMES
2LA.    PREPARATORY TO COMMENCING COUNT.
2LB.    DURING TRIAL COUNT.
2LB-C.  DURING TRIAL COUNT AND COMPLEMENT.
2LC.    DURING COMPLEMENT
2LC-A.  ALL TIME EXCEPT BETWEEN START AND END OF COUNT.
2LE.    DURING PRINT.
2LG.    AC RESET CONTROL (MAN. OR AUTO.)
2LHF.   ALL TIMES EXCEPT DURING TURNTABLE RESET.
2LI.    INDEX
2LR.    ALL TIMES WITH RELAY 7 DE-ENERGIZED
2LS.    ALL TIMES EXCEPT WHEN STOP SWITCH PRESSED
2LST.   WHILE START SWITCH PRESSED
2LT.    PRINTER TIME CLUTCH.

FIG. 12

Inventor
William D. Howell.
by Smart & Biggar
Attorneys.

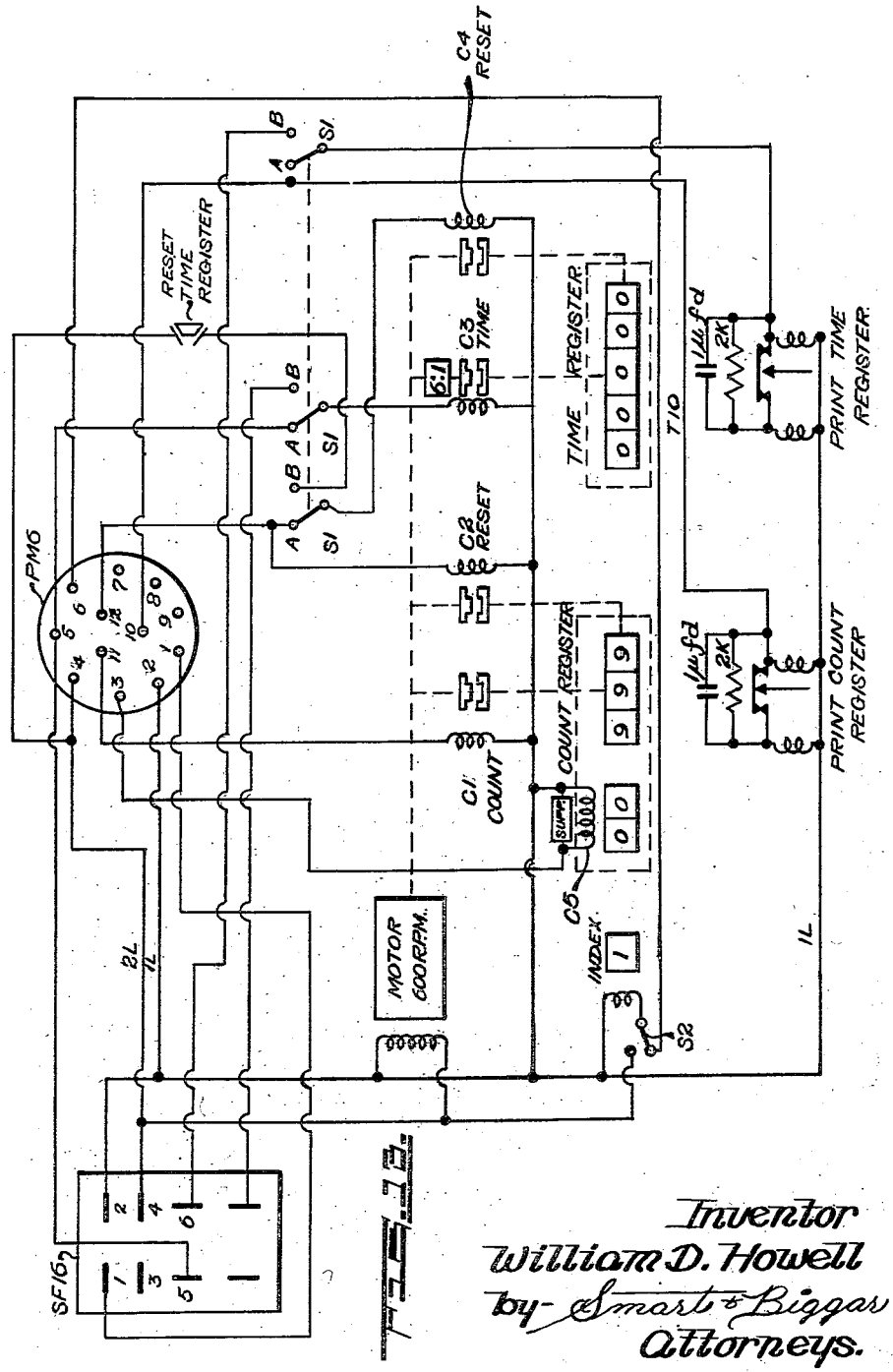

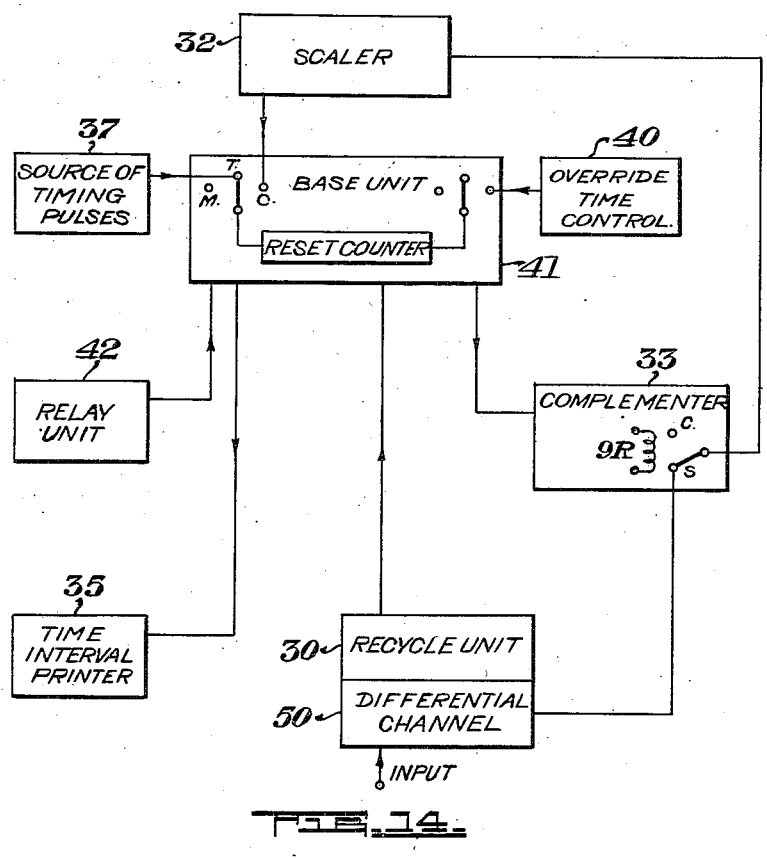

United States Patent Office 2,803,405
Patented Aug. 20, 1957

2,803,405

AUTOMATIC COUNTING APPARATUS

William D. Howell, Deep River, Ontario, Canada, assignor, by mesne assignments, to the United States of America as represented by the United States Atomic Energy Commission Application June 2, 1952, Serial No. 291,354

6 Claims. (Cl. 235—92)

The invention relates to apparatus for automatically recording the results of counting operations on trains of electrical pulses, for example, such as may be produced by a Geiger-Muller tube to provide a measure of radioactivity when detecting radiations during nuclear measurements.

There are two methods of obtaining the counting rate (i. e. the mean rate of occurrence), the one being commonly called the count controlled method and the other, the time controlled method. In the count controlled method, the time taken to obtain a predetermined count total is measured while in the time controlled method, the count for a predetermined time is measured. The count controlled method of obtaining the counting rate has the advantage of yielding results, over a series of related trials, of which all have equal statistical accuracies, but against this useful feature there is the serious disadvantage, in the case of using apparatus which automatically makes the series of trials, that a trial in which the counting rate is low may occupy the apparatus for a great length of time and so delay the completion of the series of trials. The time controlled method ensures that a given series of trials will be completed in an allotted time and is frequently preferred in the case of trials in which the counting rate varies with time. This method has the further advantage in plotting decay curves that each reading obtained gives the counting rate ratios directly without additional division, but also has the disadvantage of reduced statistical accuracy in the case of a trial having a low counting rate.

The counts for a series of trials can be taken either manually with the aid of count indicating apparatus and a clock, or automatically using apparatus consisting of a cycle control unit to start and stop each trial, an electronic scaler unit to scale down the counts, a reset counter for predetermining the count or time for each trial, and a standard time interval printer unit to record the results. Each of these units is well known in the art and, for example, in the case of determining the counting ratio for a series of samples of radioactive materials, the cycle control unit may be a turntable on which the samples are arranged in a circle near its outer edge. The turntable may control the operation of switches which in turn control the scaler unit and the printer unit. The electronic scaler unit may be of the well known type described in the textbook "Electronics," Elmore and Sands, McGraw-Hill Company Inc., New York, 1949, pages 206–212; the reset counter may be an Eagle Microflex reset counter manufactured by the Eagle Signal Corporation of Moline, Illinois, U. S. A., and the standard time interval printer unit may be a Tracergraph SC–5A, supplied by Tracerlab, Inc., 130 High Street, Boston 10, Mass., U. S. A., or a type CPR time interval printer manufactured by Simplex Recorder Company, Gardner, Mass., U. S. A.

The manual method of taking the counts for a series of trials is time consuming and tedious to the operator and so it is desirable to use automatic apparatus. However, the results obtained with the automatic apparatus known prior to the present invention, in the case of time controlled operations, have contained inaccuracies introduced by the apparatus and, in the case of count controlled operations, the apparatus has been subject to the disadvantages mentioned above in connection with taking the counting rate for a trial having a low counting rate. The inaccuracies introduced into the results by the prior art apparatus, during time controlled operations resulted from the use of an electronic scaler which, while giving the apparatus good resolution, had the disadvantage that at the end of the trial, the counts registered by it after the occurrence of its last output pulse were not available for recording by the printer. Consequently the result recorded by the printer was not the full count for the trial. A suggested method of overcoming this disadvantage was to use a scaler having neon light "eyes" which indicate the exact count at any instant and arranging a motion picture camera to photograph the eyes at the end of each trial. This method has not been commonly used due to the complication involved in arranging and synchronizing the photographic equipment, and awaiting development of the film before obtaining the results.

According to the present invention, apparatus is provided which, in the case of time controlled operation, automatically records any information stored by the scaler but not yet transferred to the printer at the end of the predetermined time controlled operation and, in the case of count controlled operation, provision is made to prevent a weak sample from occupying the apparatus for an excessively long time. Apparatus according to the present invention for providing count or time control of a series of counting operations on trains of electrical pulses and for automatically recording the results, comprises an electronic scaler adapted to produce an output pulse for a number of input pulses in accordance with a predetermined scale, a source of regular timing pulses, a source of regular complementing pulses, a reset counter arranged to be connected to count pulses from the scaler for count control of the counting operations and to be connected to count pulses from the source of timing pulses for time control of the counting operations; the reset counter being connected to control the operation of the scaler so that, upon a predetermined number of pulses being fed to the reset counter, the reset counter stops the scaler from being actuated by the trains of electrical pulses and connects the source of complementing pulses to the scaler until it produces an output pulse; a time interval printer having a print stamper and a timer motor for adjusting the setting of the print stamper to indicate elapsed time, the print stamper being arranged to be operated by input pulses in accordance with a predetermined program and the reset counter being connected to control the operation of the timer motor to adjust the setting of the print stamper.

Apparatus according to the present invention has the important advantage that at the termination of the count for each sample, the information stored in the scaler is automatically obtained in printed form by the supplying of regular complementing pulses to the scaler until an output pulse is obtained. The number of complementing pulses supplied to the scaler is shown in printed form by recording the time during which the complementing pulses are supplied. In the case of count controlled operation, an override time control can be used to limit the time a weak sample can occupy the apparatus and, upon operation of the override time control, complementing pulses are automatically supplied to the scaler to obtain a printed record of the information stored in it.

The invention will be further described with reference to the accompanying drawings in which:

Figure 1 is a simplified block diagram of an arrangement of apparatus in accordance with the invention.

Figure 2 is a chart showing the programming for fully automatic time or count controlled operations in apparatus as shown in Figure 1, Figure 3 is a further simplified block diagram of an arrangement of apparatus according to the invention, Figure 4(a) and Figure 4(b), which together form Figure 4, are a circuit diagram of the base unit shown in Figure 3, Figure 5 is a circuit diagram of the timing impulse generator, Figure 6 is a circuit diagram of the override time control, Figure 7 is a circuit diagram for the printer unit, Figure 8 is a circuit diagram for the complementer unit, Figure 9 is a circuit diagram for the recycle unit, Figure 10 is a circuit diagram for the relay unit, Figure 11 is a circuit diagram for the elapsed time control unit, Figure 12 is a chart and table showing times of energization of the A. C. lines shown in Figures 4 to 12.

Figure 13 is a circuit diagram of a preferred arrangement of the printer unit, and Figure 14 is a simplified block diagram showing an automatic scanning pulse analyzer in accordance with the invention.

The block diagram shown in Figure 1 is intended to give only a general idea of the arrangement of apparatus according to the invention, more specific information as to the circuits of the various units and the interconnections between units being given in the other figures of the drawings. As shown in Figure 1, apparatus according to the invention comprises a recycle unit 30, which may include the source of pulses to be counted, connected to one of the contacts of a switch 31 so that it can be connected to the input of an electronic scaler 32. The electronic scaler 32 may be of the type described in United States Patent No. 2,691,100 issued October 5, 1954, for "Electronic Counter," in the names of N. F. Moody and W. D. Howell. The input of the scaler 32 is also arranged to be connected through the switch 31 either to an off-position or to the output connection of a source 33 of regular complementing pulses (referred to below as the complementer 33). The output of the scaler 32 is connected to the circuit for controlling the operation of the print stamper 34 of a time interval printer 35 and is also connected to one contact of a switch 36. The other contact of the switch 36 is connected to the output of a source 37 of regular timing pulses. The switch 36 is arranged to connect either the output of the scaler or the output of the source 37 of timing pulses to the input of a reset counter 38. The output of the reset counter is connected to control the operation of the timer motor 39 of the time interval printer 35. The output of the reset counter 38 is also arranged to control the operation of the switch 31 as indicated in dotted line in Figure 1. An override time control 40 is also connected to the timer motor 39 and the switch 31 so that if, during count controlled operation, a week sample occupies the apparatus for longer than a predetermined time, the override time control can connect the complementer 33 to the scaler 32 and at the same time start the timer motor 39.

In time controlled operation of the apparatus shown in Figure 1, the reset counter 38 is connected to the source 37 of regular timing pulses through the switch 36, and it is adjusted so that it will perform its switching functions and reset itself at a count equivalent to the predetermined time for each trial. The recycle unit 30 starts the count after the source of pulses to be counted is in position and after the necessary internal connections in the apparatus have been made. The pulses are supplied from the recycle unit 30 through the switch 31 to the input of the scaler 32. Assuming that the scaler 32 is designed to scale down in the ratio of 1000:1 it will produce an output pulse for each 1000 input pulses received from the recycle unit 30. Each output pulse from the scaler 32, representing 1000 pulses from the source of pulses 30, is fed to the print stamper 34 of the time interval printer 35 causing the print stamper 34 to print a row of digits, the values of which depend on the position of the printing wheels of the print stamper 34. During time controlled operation the timer motor 39 is disconnected from the print stamper 34 and the printing wheels do not rotate so that a row of zeros is printed each time the print stamper 34 is energized. When the reset counter 38 has received a number of timing pulses equivalent to the predetermined time for the trial, it will operate causing the timer motor 39 to be coupled to the print stamper 34 and the scaler 32 to be connected to the complementer 33. Upon the next output pulse from the scaler 32 the print stamper prints the time during which complementing pulses were supplied to the scaler 32 and the apparatus then recycles for the next trial. The following table shows an example of a printed record for a time controlled operation and provides an explanation of how the record is interpreted:

TABLE 1

*Printed record for a time controlled operation using a standard time interval printer*

Trial period preset at one minute.
Scaling factor of 1000.
Complementing pulses supplied at the rate of 100/minute.
Digits of printing wheels of print stamper change at rate of 100/minute.
(Read up)

| Trial No. | Printed Record | Significance of Printed Record |
|---|---|---|
| 4 | 0000.00 | Start of next trial—indicating it is greater than 1,000 counts. |
| 3 | 0003.06 | } Count=2,000−306=1,694. |
| 3 | 0000.00 | |
| 2 | 0001.65 | Count=1,000−165=835. |
| 1 | 0000.40 | |
| 1 | 0000.00 | |
| 1 | 0000.00 | |
| 1 | 0000.00 | } Count=6,000−40=5,960. |
| 1 | 0000.00 | |
| 1 | 0000.00 | |
| 1 | 0000.00 | |

Table 1 shows that in trial No. 1, 5960 pulses were produced by the sample under measurement during one minute. Each row of printed digits represents a thousand input pulses to the scaler 32 and the last row (the upper one for trial No. 1) shows that in order to obtain the final output pulse from the scaler 32 the complementer 33 had to supply complementing pulses for .40 minute and, therefore 40 complementing pulses (.40×100, i.e. time × the rate at which complementary pulses are supplied) were received by the scaler. Accordingly the count of pulses from the sample during the trial is 6000−40=5,960 pulses, which in more general terms is the number of printed rows of digits (6) multiplied by the scaling factor (1000) minus the compliment (.40×100).

For count controlled operation, the reset counter 38 is connected to the output of the scaler 32 through the switch 36, and it is adjusted so that it will perform its switching operations and reset itself at a count equal to the predetermined count for each trial. The timer motor 39 is coupled to the print stamper 34 so that each output pulse from the scaler 32 will cause the time of its occurrence to be printed by the time interval printer 35. The recycle unit 30 starts the count when the source of pulses to be counted is in position and after the necessary internal connections in the apparatus have been made. The pulses from the recycle unit 30 are supplied through the switch 31 to the input of the scaler 32. If, as in the case of the time controlled operation described above, the scaler 32 is designed to scale down in the ratio of 1000:1 it will produce an output pulse for each 1000 input pulses. Each output pulse from the scaler 32, representing 1000 pulses from the recycle unit 30, is fed to the print stamper 34 of the time interval printer 35 causing the print stamper 34 to print the time of its occurrence. At the same time, the reset counter 38 is counting the output pulses of the scaler 32 and, upon the predetermined count for the trial being reached, it performs its switching functions and resets. The printed record produced by the time interval printer 35 shows the time for the predetermined count and the apparatus automatically recycles for the next trial. As shown in Figure 1, an override time control 40 is provided so that the apparatus will not be occupied with a low counting rate trial for an excessively long time. The override time control can be set to operate at a predetermined time after the start of each trial and, upon operation, it causes the print stamper 34 to print the time and simultaneously causes the input of the scaler 32 to be switched to the complementer 33. The next output pulse from the scaler 32 causes the time to be printed, and the apparatus then recycles for the next trial. The following table shows an example of a printed record for a count controlled operation and provides an explanation of how the record is interpreted:

TABLE 2

*Printed record for a count-controlled operation having override time control and using a standard time internal printer*

Override time control set for 15 minutes.
Count Controlled for a count of 5,000.
Scaling factor of 1,000.
Complementing pulses supplied at the rate of 100/minute.
Digits of printing wheels of print stamper change at rate of 100/minute.

(Read up)

| Trial No. | Printed Record | Comments |
|---|---|---|
| 4 | 0001.35 | Time for 1st 1,000 counts of trial No. 4. |
| 3 | 0002.56 | 5,000 counts in 2.56 minutes. |
| 3 | 0002.55 | Each row represents 1,000 counts. |
| 3 | 0002.01 | Total count 5,000. |
| 3 | 0001.50 | Override time control inoperative. |
| 3 | 0001.02 | }Time printed to nearest .01 minute. |
| 3 | 0000.54 | |
| 2 | 0020.67 | —Override time control operated at 15.02 min. |
| 2 | 0015.02 | }Sample count is 2,000−(2067−1502)=1,435 in 15.02 min. |
| 2 | 0010.08 | |
| 1 | 0022.19 | —Override time control operated at 15.08 min. |
| 1 | 0015.08 | Sample count is 1,000−(2219−1508)=289 in 15.08 min. |

As indicated by Table 2 the total count in thousands for any given trial is one less than the number of rows of printed digits in the printed record for the trial, and the difference between the two final printed times is equal to the complement which must be subtracted from the total count in thousands.

Figure 2 shows charts indicating the programming cycles for both time controlled and count controlled operations. Part A of Figure 2 shows the programming cycle for time controlled operation in which the programming cycle consists of a trial count during which pulses from the sample under observation are scaled down by the scaler and indicated as a scaler output pulse for each thousand input pulses. The reset counter is time controlled during the trial count and the printing wheels of the print stamper are not connected to the timer motor so that a row of zeros is printed for each thousand pulses at the input of the scaler. At the end of the predetermined time during which the count is to be taken the reset counter is reset and the complement period begins. The complement period continues until the scaler produces its next output pulse indicating that its last thousand input pulses has been completed. During the complement period the print stamper is engaged to the timer motor and registers the time during which the complementing pulses are supplied to the scaler.

The program for count controlled operation with no override time control is shown in Figure 2B. During the trial count the reset counter is count controlled and the print stamper is connected to the timer motor so that it prints the time of each output pulse from the scaler representing 1000 pulses from the sample under observation. If the predetermined count for the trial is 3,000 the third output pulse from the scaler (representing 3,000 pulses from the sample) causes the trial count to end. Time is then allowed for the printing operation and for resetting the apparatus for the next cycle.

The programming cycle for count controlled operation with override time control is shown in Figure 2C. This programming cycle consists of a trial count period, a complementing period and periods to allow for printing and resetting. During the trial count the time for each 1000 counts is printed as well as the time of the beginning and end of the complementing period. The complementing period begins at the end of the predetermined time allowed by the override time control for a weak sample to occupy the apparatus and ends with the next output pulse from the scaler.

The block diagram of a preferred embodiment of the invention is shown in Figure 3. Several of the blocks shown in Figure 3 correspond to those shown in Figure 1 and are designated by the same reference numerals. As shown in Figure 3, a central base unit 41, in conjunction with a relay unit 42, is used to interconnect the other units whch, besides the units shown in Figure 1, include a time interval printer 43 of which the construction and operation will be described below.

The schematic wiring diagrams for the base unit 41, including the reset counter 38, is shown in Figure 4. The base unit also includes a relay 1R which controls the operation of the reset counter 38, a power on-off switch S1, a switch S2, a manual-count control-time control switch S3, a start switch S4, a stop switch S5, and a reset switch S6. The base unit provides the necessary interconnections between the various units of the apparatus by means of socket connections designated as follows:

SM1—to power mains,
SM2—to register output of scaler 32,
SM3—to scaler control circuits,
SF4—to source 37 of regular timing pulses,
SF5—to override time control 40,
SF6—to time interval printer 35,
SF7, SF8 and SF9—to relay unit 42,
SF10 and SF11—to recycle unit 30, and
SF12—to complementer.

In the designations for the sockets, the letter S indicates it is a socket and the letter M or F indicates whether it is a male type or a female type. The design and construction of reset counters suitable for the unit 38 are well known, for example the Eagle Microflex Reset Counter manufactured by the Eagle Signal Corporation of Moline, Illinois, U. S. A.

A circuit for the source 37 of regular timing pulses which is operative during time controlled operation of the apparatus is shown in Figure 5 and comprises an interlock relay 2R, a 10 R. P. M. synchronous motor driving a cam operated switch S7, and a plug connector PM4. The designation PM4 for the plug connector indicates that it is a plug (P), male type (M), and the numeral (4) indicates that the plug connector is for connection to the socket SF4 (base unit, Figure 4). In operation, the cam operated switch S7 produces narrow time marker pulses spaced at 0.1 minute time intervals. The interlock relay 2R ensures that the trial starts at the right instant in the time cycle; the predetermined time for the time controlled operation being equivalent to an integral number of timing pulses.

Figure 6 shows the circuit of the override time control 40 which may be a Cramer Tec-Timer, manufactured by R. W. Cramer Company, Centerbrook, Conn., U. S. A.

The override time control unit 40 has a plug connector PM5 for connection to the base unit 41. The unit commences to time when the supply line is connected to its motor and, after the preselected period of time, it performs its switching functions. The unit is reset immediately the supply line to its motor is interrupted.

The standard printer unit 35 shown schematically in Figure 7 may be a well known time interval printer such as the Tracergraph SC–5A time interval printer supplied by Tracerlab, Inc., 130 High Street, Boston 10, Mass., U. S. A., or the type CPR time interval printer manufactured by Simplex Time Recorder Company, Gardner, Mass., U. S. A. The printer is arranged to be connected to the socket connector SF6 of the base unit 41 (Figures 3 and 4) by a plug connector PM6 which is connected to the circuits of the printer through connectors SF13 and PM13, the purpose of which will be explained below in connection with Figure 11. The operation of the various printer controls is self evident from the circuit diagram. As shown resistors and capacitors supply spark suppression which avoids the possibility of the scaler or other equipment registering spurious counts due to sparks. Provision can be made for sample indexing if desired.

cam operated switches S8 to S12 inclusive. In operation, counting is started by the operation of the switch S10 and, while the trial is in progress, the motor is stopped by the action of the relay unit 42 (see Figures 3 and 10). On completion of the trial count the motor restarts and sequentially operates switch S11 (print—see Figure 2), S12 (reset printer and relay unit), and S9 (reset scaler). The same motor may be used to drive the turntable of the sample changer, the switch S8 being connected to stop the motor in its correct cyclic condition for changing a sample manually, while the relay 10R and the switch S2 provide the necessary connections for reversing the turntable.

The relay unit, shown schematically in Figure 10, is arranged to be connected to the base unit 41 (Figures 3 and 4) through male plug connectors PM7, PM8 and PM9, and contains relays 3R, 4R, 5R, 6R, 7R and 8R and their associated interconnections. The sequence of operation and function of each of the relays of the relay unit is tabulated in the following table. All the relays with the exception of relay 5R are A. C. operated. Relay 5R derives D. C. power for its operation from the scaler 32 (Figure 3).

TABLE 3

| Relay No. | Counting Function | | Contact Nos. | Load Circuits (See Fig. 10) |
| --- | --- | --- | --- | --- |
| | Time Controlled | Count Controlled | | |
| 3R | Energized at start of trial. De-energized by reset control. | As in previous column. | 1 and 2<br>4 and 5<br>8 and 9<br>10 and 11 | Self maintaining.<br>Conditions relay 4R.<br>Breaks start circuit.<br>Conditions print circuit. |
| 4R | Energized at end of trial. De-energized by opening of relay 8R. | Energized via relay R7 when actuated by override time control. Otherwise inoperative. | 7 and 8<br>10 and 11<br>1 and 2<br><br>5 and 6 | Starts scaler counting the complement.<br>Energizes relay 9R (Fig. 8).<br>Energizes printer clutch (Time-controlled only).<br>Opens supply to recycling motor. |
| 5R | Energized for 40 msecs. on each Scaler output pulse. | As in previous column. | 5 and 6<br><br>1 and 2 | Releases relay 8R on completing complement count and resets override time control.<br>Actuates print stamper. |
| 6R | Energized at start of trial. De-energized at end of trial. | As in previous column. | 1, 2 and 3<br>5 and 6<br>10 and 11<br>7 and 8 | Stops recycling motor and energizes relay 3R.<br>Opens circuit to relay 4R.<br>Energizes relay 8R.<br>Completes print circuit to relay 5R (5 and 6). |
| 7R | Inoperative | Energized by operation of override time control. | 1 and 2<br>7 and 8<br>5 and 6<br>11 and 12 | Energizes relay 4R.<br>Prints time when override control operates.<br>Opens, rendering 5R (5 and 6) inoperative.<br>De-energizes reset counter clutch. |
| 8R | Energized during trial and complement periods. | As in previous column. | 1 and 2<br>4 and 5 | Self maintaining.<br>Start override time control (count-controlled only). |

The complementer unit 33, as shown in Figure 8, comprises a 100 R. P. M. synchronous motor arranged to drive a slotted scanning disc to interrupt a light beam focused on the cathode of a photocell V1. The interrupted light beam produces a train of positive pulses in the anode circuit of a tube V2 and, after differentiation, these pulses trigger a gas triode V3 producing either positive or negative output pulses which can be selected by a switch SW1 depending on the requirements of the input circuit of the scaler 32 (Figure 3). Interchangeable scanning discs for different pulse rates may be provided, for example discs having 1, 6 or 10 slots for pulse rates of 100, 600 or 1,000 per minute. The function of the relay 9R is to switch the connection to the scaler input (Figure 3) from the source of pulses to be counted to the complementer. The external connections to the complementer are made through a plug connector PM12 which plugs into the socket connector SF12 of the base unit (Figure 4).

The recycling unit 30 which controls the sequence of operation of the various units (see Figure 2) is shown in Figure 9. The recycling unit comprises a plug connector PM10 for connection to the socket connector SF10 of the base unit 41 (Figures 3 and 4), a plug connector PM11 for connection to the socket connector SF11 of the base unit, a relay 10R, an on/off switch S1, a switch S2 for reversing the turntable, and a series of motor driven In certain experiments, particularly the plotting of decay curves, it is necessary to record the centre time of each trial referred to some arbitrary time zero which is not necessarily the beginning of the counting operation. A separate unit as shown schematically in Figure 11 can be used to control a second time interval printer (see Figure 7) to record these elapsed times. The control unit (Figure 11) comprises a reset counter, a relay 11R, an on/off switch S1, a timer on/off switch S2, a start switch S3 and a stop-reset switch S4. The reset counter dial is set for one-half the setting of the reset counter in the base unit (Figure 4), and impulses for its count coil are derived from the relay 1R of Figure 4. Connection to the base unit (Figure 4) is made through the connectors PM16, SF16 and PM6. The socket connector SF13 provides the necessary connections to the trial count printer, and the socket connector SF18 provides the necessary connections to the elapsed time printer.

The method of operation in a count controlled measurement is as follows: (zero times being assumed to correspond with the start of the first trial). When the first trial is started, the reset counter of the elapsed time control unit (Figure 11) is energized and in turn closes relay 11R which sets the printer in motion. Half way through the trial the reset counter is deenergized and the time is printed. The reset counter remains de-energized until the start of the next trial. When the action is repeated, the printer timing mechanism remaining continuously engaged so that throughout the measurements the elapsed time for each trial is printed. The printer can be stopped and reset by pressing the switch S4. The switch S3 provides a means of setting the printer in motion at any convenient time prior to the beginning of the counting operations.

The operation of the various circuits shown in Figures 4 to 11 inclusive is shown graphically in Figure 12 and in the following tables (Tables 4, 5 and 6):

TABLE 4

*Switching sequence for a time controlled trial with a sample changer*

| UNIT | START | START COUNT | TRIAL (SAMPLE) COUNT | TOTAL COUNT — COMPLEMENT | PRINT | A/C RESET | D/C RESET | START |
|---|---|---|---|---|---|---|---|---|
| CYCLING UNIT | S10: 7–8 | | | | S11: 4–5 Complement | S12 1-2 Printer 2/3 Relay 3R | S9: 11/12 Scaler | |
| TIMING IMPULSE GENERATOR | 2Re —5–4 (Conditions 1R) —5/6 (Stop Turntable) —1–2 (Hold) | S7: 1/2 | | | | | | |
| RESET COUNTER AND RELAY 1R | | 1Rd: 2–3; 5–6  Reset-Counter Clutch ⎡A–B Hold ⎢3–4 Start Count ⎣1/2 Release 2R | ← Count Coil Sums Time Markers → | Stop Count Reset Reset-Counter A/B Releases 6R | | LEGEND Re—Relay energized Rd—Relay de-energized Contacts make—1–2 Contacts break—1/2 | | |
| RELAY UNIT | | 6Re: 1–2: 7–8 Print Circuit Conditioned 3Re: 1–2: 8/9 Hold Open Start Line ← 5Re Energized Every 1000: 1–2 Prints → | 4–5 Conditions 4R | 6Rd: 5–6 4Re: 10–11: 7–8 (Count On) 1–2 (Printer Totalizes Complement) | 5Re: 1/2 4Rd: 7/8: (Stop Count) 5–6: (Restart Motor) 10/11 (De-energize Relay 9R) | | | |
| COMPLEMENTER | | | | 9 Re Switch to Complement | | | | |

TABLE 5

*Switching sequence for a count controlled trial with sample changer but without override time control*

| UNIT | START | START ← TRIAL (SAMPLE) COUNT → STOP | PRINT | A/C RESET | D/C RESET | START |
|---|---|---|---|---|---|---|
| CYCLING UNIT | S10: 7–8 | | S11: 4–5 Time for Preset Count | S12 1-2 Printer 2/3 Relay 3R | S9: 11/12 Scaler | |
| TIMING IMPULSE GENERATOR | 2Re —5–4 —5/6 (Stop Turntable) | | | | | |
| RESET COUNTER AND RELAY 1R | | 1Rd: 2–3 Reset-Counter Clutch ⎡A–B Hold ⎢3–4 Start Count ⎣1/2 Release 2R ← Count Coil Sums Scaler Output Until Preset Count Attained → Resets Reset-Counter A/B; 3/4 (Stop Count) Releases 6R | | LEGEND Re—Relay energized Rd—Relay de-energized Contacts make—1–2 Contacts break—1/2 | | |
| RELAY UNIT | | 6Re: 1–2: 7–8 Conditions Print Circuit 3Re: 1–2: 8/9 Hold Open Start Line ← 5R Energized Every 1000: 1–2 Prints Time Except When S2 Open Then Final Time Only Printed → | 6Rd: 5–6 4Rd: 7/8 Stop Count 5–6: Restart Cycle Motor | | | |

TABLE 6

*Switching sequence for a count controlled trial with a sample changer and with override time control*

| UNIT | START | START | TRIAL (SAMPLE) COUNT | COMPLEMENT | PRINT | A/C RESET | D/C RESET | START |
|---|---|---|---|---|---|---|---|---|
| CYCLING UNIT | S10: 7-8 | | | | S11: 4-5<br>Time for Pre-set Count or Complement | S12<br>1-2 Printer<br>2/3 Relay 3R | S9: 11/12<br>Scaler | |
| TIMING IMPULSE GENERATOR | 2Re ⌐5-4<br>└5/6 (Stop Turntable) | | | | | | | |
| RESET COUNTER AND RELAY 1R | | 1Rd: 2-3<br>Reset-Counter Clutch ⌐A-B Hold<br>├3-4 Start Count<br>└1/2 Release 2R<br>←Count Coil Sums Scaler Output Until Preset Count Attained or Override Time Control Operates→<br>7Re: 11/12<br>Resets Reset-Counter<br>A/B; 3/4 (As In *Table 5* for Strong Sample;<br>Releases 6R Weak Sample Complementer Operates) | | | | | | |
| RELAY UNIT | | 6Re: 1-2: 7-8 4-5<br>Conditions ─Conditions 4R<br>Print Circuit<br>3Re: 1-2 8/9<br>Hold Open Start Line<br>←5R Energized Every 1000 Count;<br>1-2 Prints Time→ | | 6Rd: 5-6<br>7Re: 1-2: 7-8 (Print Time of Override)<br>4Re: 10-11: 7-8 1-2<br>Count On Printer Starts Totalising Complement | Stop Count | 4Rd: 7/8: 6-6:<br>Restart Cycle Motor | 10-11<br>De-energize Relay 9R | |
| COMPLEMENTER | | 9Re Switch to Complement | | | | | | |

LEGEND
Re—Relay energized
Rd—Relay de-energized
Contacts make—1-2
Contacts break—1/2

In operation, the turntable of the recycle unit 30 (Figures 3 and 9) has the samples to be measured arranged in a circle upon it in the usual manner so that, upon rotation of the turntable, each sample in turn comes directly beneath the Geiger counter. As soon as each sample is directly beneath the Geiger counter a cam operated hoist of well known construction lifts the sample to the window of the Geiger counter. Just as the sample comes to its rest position at the Geiger counter the switch S10 (Figure 9) closes, starting the count and stopping the turntable motor. Upon the count being completed, the turntable motor is started, the hoist lowered and the next sample is moved into position. During the time required to change samples, the result is printed and the counting mechanism is reset. Figure 12 shows the state of energization of the various A. C. lines during operation of the equipment, and Tables 4, 5 and 6 indicate the programming and point to point switching throughout a cycle for time controlled and count controlled trials. Tables 1 and 2, referred to above in connection with Figure 1, show examples of the printed records obtained.

A preferred construction of a time interval printer 35 (Figures 1 and 3) is shown in Figure 13. The preferred printer 35 comprises a synchronous motor (600 R. P. M.) coupled to four clutches, a count clutch C1, a reset count register clutch C2, a time clutch C3 and a reset time register clutch C4. The printer register drum is divided into three sections, an index register, a count register in two parts—one numbered 0–99 for scaler output, pulse storage numbered 0–99, one numbered 999–0 for registering the complement, and a time register numbered 0–999.99 minutes or 0–9999.9 seconds depending on the gear ratios used. Separate printing mechanisms are provided for the count and time registers, the former also having a mechanism for ejecting the printed paper containing the whole record, namely, the sample index, the count and the time. A function switch S1 is connected so that when it is in its normal position (designated A) the circuits are arranged for time or count controlled operations for individual sampling. In the position B of the switch S1, the circuits are arranged for decay measurements which are time controlled and have the elapsed centre time for each count printed. A spring loaded, press to operate, switch S2 provides for remote control connections for the operation of the index register or for manual advancing of the index register. Connections to the base unit 41 (Figures 3 and 4) are made through a plug connector PM6, and connections to the elapsed time control unit 43 (Figures 3 and 11) are made through a socket connector SF16. When the printer shown in Figure 13 is used, the following modifications must be made in the circuits of the base unit (Figure 4) and the relay unit (Figure 10). In the base unit (Figure 4), section H of the switch S3, the connection to the count contact is broken and a connection is made between the count contact and the time contact. Also, the connections to the pins 8 and 9 of the socket SF6 are broken. In the relay unit (Figure 10), contacts 1 and 2 of relay 5R, break the connection to contact 1 and connect contact 1 to pin 1 of the plug PM9, and break the connection to contact 2 and connect contact 2 to pin 18 of the plug PM9. Using the printer shown in Figure 13 and assuming the predetermined scale of the scaler is 1000:1 then, during time-controlled operation, each count of 1000 is totalized in the storage register of the printer. At the same time the clutch of the time register is engaged (this feature is not essential) for the duration of the pre-set time interval. At the end of the pre-set time, the complementer operates and registers the residual scaler score by engaging the count clutch. Counting is then complete, the result is printed, the index advanced one, and the system is reset. In count-controlled operation, if the pre-set count is achieved within the time limit imposed by the override time control, then the complementer is not brought into operation. If the sample is weak, the override time control will operate. At the start of a sample count the time clutch is engaged, and each count of 1000 is totalized in the storage register until counting is complete whereupon the result is printed and the system reset. Time or count-controlled sample counting can be carried out in which a time record is provided of elapsed centre time (or any other suitable time) of each sample count as measured from some arbitrarily chosen zero time reference. In this case, each sample count is totalized on the count register, but the time clutch is continuously engaged and prints the time half way through each sample count and is never reset until the whole of the counting operations have been carried out. Since the printing of the time is half way through each sample count, the time and count print impressions are made independently to avoid the necessity of double printing and so simplify the printed record.

The following table (Table 7) shows examples of the count-time records obtainable with a printer as shown in Figure 13:

TABLE 7

| Printed Record | | | Significance of Printed Record |
|---|---|---|---|
| Index | Count | Time | |
| 1 | 10,000 | 005.43 | Sample 1, *count controlled* for 10,000 counts. Time 5–43 mins. |
| 2 | 02,362 | 015.00 | Sample 2, *count controlled* for 10,000 counts but stopped at 15 mins. by override time control. |
| 1 | 05,362 | 002.00 | Sample 1, *time controlled* for 2 mins. Count of 5,362. |
| 3 | 09,673 | 002.50 | Decay measurements, *time controlled* for 5 mins., printed elapsed centre time for each sample. |
| 3 | 09,212 | 008.60 | |
| 3 | 08,756 | 014.70 | |

As shown in block form in Figure 14, automatic counting apparatus according to the present invention can be used in conjunction with a differential channel 50 (which replaces the turntable) to provide an automatic pulse amplitude analyser (kicksorter). The analysing section of the apparatus may be of the well known type which when fed with random pulses of amplitude O to V classifies them according to amplitude intervals of $\Delta V$. The interval $\Delta V$ is known as the channel width, and the amplitude V contains N channels, where $$N = \frac{V}{\Delta V}$$

In the apparatus shown, only one differential channel 50 exists physically and it is made to assume the N levels sequentially. The pulse distribution is given by the time the channel 50 must remain at each level in order to sum a constant pulse total (count controlled operation); or alternately it may remain at each level for a fixed time (time controlled) and print the pulse totals. Override time control can be used with the count controlled method. The recycle unit is, in general, the same as shown in Figure 9, and has a motor to operate the cam switches after each trial. A uniselector switch can be used to place the channel 50 at each of its levels and is analogous in action to the mechanical motion of a sample changing turntable. The relay 10R is omitted and an extra cam is added to actuate the uniselector at the end of each trial. Presentation of the results is the same as described above in connection with turntable operation.

What I claim as my invention is:

1. Apparatus for providing count or time control of a series of counting operations on trains of electrical pulses and for automatically recording the results, comprising a source of trains of electrical pulses, an electronic scaler adapted to be connected to said source and to produce an output pulse for a number of input pulses in accordance with a predetermined scale, a source of regular timing pulses, a source of regular complementing pulses, a reset counter, a first switch means controlled by the reset counter for connecting the scaler to the source of trains of electrical pulses and to the source of complementing pulses, a second switch means for connecting the reset counter to the scaler to count pulses from the scaler for count control of the counting operations and for connecting the reset counter to the source of timing pulses to count timing pulses for time control of the counting operations; the reset counter being adapted to operate the first switch means upon receiving a predetermined number of pulses to stop the scaler from being actuated by the trains of electrical pulses and to connect the source of complementing pulses to the scaler; a time interval printer having a print stamper and a timer motor for adjusting the setting of the print stamper to indicate elapsed time, the print stamper being connected to the scaler and adapted to be operated by an output pulse of the scaler and the timer motor being connected to the reset counter and adapted to be controlled by the reset counter to adjust the setting of the print stamper.

2. Apparatus as defined in claim 1, in which the second switch means connects the reset counter to the source of regular timing pulses and is adapted to disconnect the timer motor from the print stamper during the counting of a predetermined number of pulses by the reset counter and to connect the timer motor to the print stamper during the period complementing pulses are supplied to the scaler thereby to obtain a recorded measure of the time during which said complementing pulses are supplied.

3. Apparatus as defined in claim 2 in which the print stamper of the time interval printer comprises two registers, the first of said registers being connected to the scaler and adapted to be adjusted in setting by output pulses from the scaler, and the second of said registers being connected to the timer motor through a clutch of which the period of engagement is controlled by pulses from the source of complementing pulses.

4. Apparatus as defined in claim 3 in which the second register is calibrated to provide readings in descending order from a number equal to the number of input pulses to the scaler which are required to produce an output pulse at the scaler.

5. Apparatus as defined in claim 1, in which the second switch means connects the reset counter to the scaler, the timer motor of the time interval printer being connected to the print stamper, said apparatus comprising an override control adapted to determine the maximum time during which said electrical pulses can be supplied to the scaler and, upon said maximum time elapsing, to discontinue the supply of said electrical pulses to the scaler and to connect the source of complementing pulses to the scaler.

6. Apparatus as defined in claim 5 in which the print stamper of the time interval printer comprises three registers, the first of said registers being connected to the scaler and adapted to be connected to output pulses from the scaler, the second of said registers being adjusted in setting by the timer motor through a clutch of which the period of engagement is controlled by pulses from the source of complementing pulses, and the third of said registers being connected to the timer motor through a clutch which is engaged during the time for each counting operation, said second register being calibrated to provide readings in descending order from a number equal to the number of input pulses to the scaler which are required to produce an output pulse at the scaler.

References Cited in the file of this patent

UNITED STATES PATENTS

| | | |
|---|---|---|
| 2,272,070 | Reeves | Feb. 3, 1942 |
| 2,566,078 | Bliss | Aug. 28, 1951 |

OTHER REFERENCES

Preset Interval Timer, Electronic Industries, July 1945, pages 97 to 99, 130, 134, 138, 142, 146.